June 21, 1966  A. J. HUNT  3,256,807
APPARATUS FOR EXTRACTING LIQUID FROM CITRUS FRUIT
Filed June 1, 1964  3 Sheets-Sheet 3

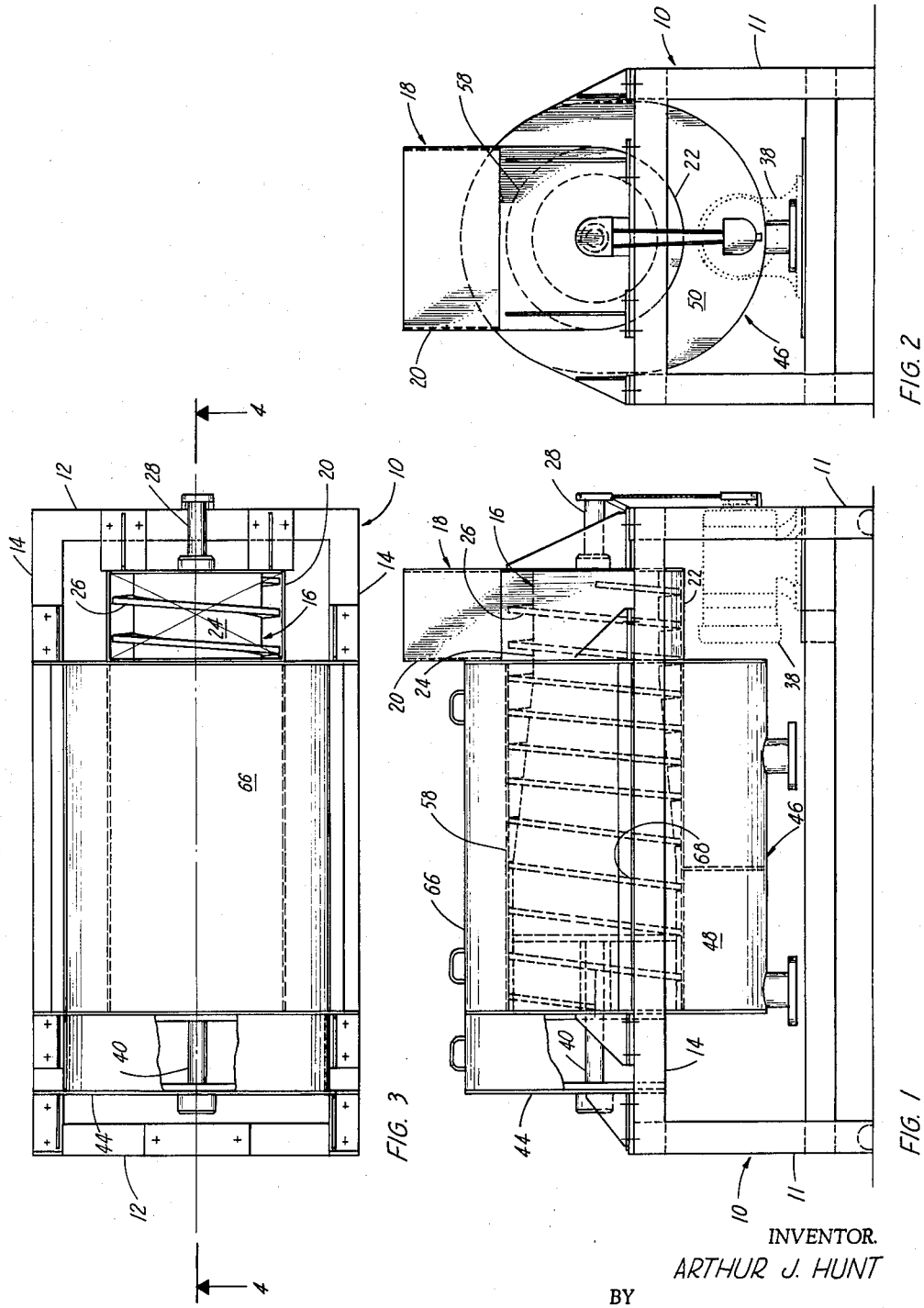

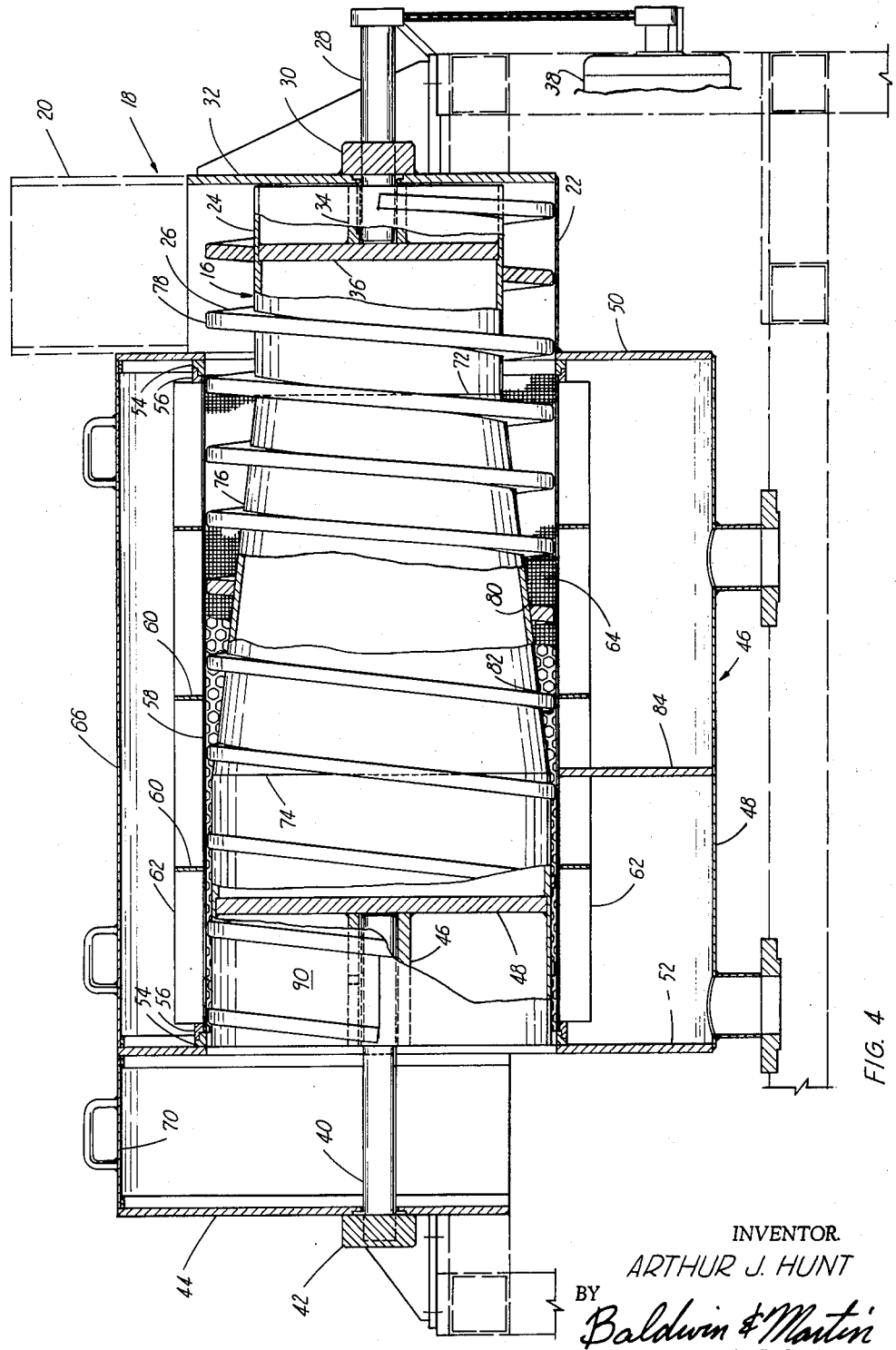

INVENTOR.
ARTHUR J. HUNT
BY
Baldwin & Martin
ATTORNEYS

United States Patent Office 3,256,807
Patented June 21, 1966

3,256,807
APPARATUS FOR EXTRACTING LIQUID
FROM CITRUS FRUIT
Arthur J. Hunt, 332 N. Halifax Drive,
Ormond Beach, Fla.
Filed June 1, 1964, Ser. No. 371,623
5 Claims. (Cl. 100—105)

This invention relates to extractors of the screw press type for processing citrus fruit, and is a continuation-in-part of my co-pending application, Serial No. 285,109 filed June 3, 1963, now U.S. Patent No. 3,135,193.

It is the primary purpose of this invention to provide a novel and improved screw press apparatus for separating the liquids and solids of citrus fruit.

It is a further object of this invention to provide a novel and improved continuously operable apparatus for extracting juice from citrus fruit which will provide significantly improved speed of extraction and which will provide improved control of the oil content in the juice. In accordance with one aspect of the invention, citrus fruit, either oranges, grapefruit or lemons, is fed into a screw press having an inlet portion which will feed the fruit in a continuous row, generally one fruit deep and one fruit wide, into a juicing section. In the juicing section, pressure is gradually applied to each fruit from a plurality of directions so as to split the fruit, as distinguished from crushing it, often substantially into two halves, and the fruit is then further gradually compressed to a substantially flat condition to complete the extraction of the juice therefrom. Subsequent to juicing of the fruit, a substantially constant relative high pressure is maintained on the skins or rinds of the fruit to extract the remaining liquid, essentially oil, therefrom. The juice and oil may be collected together, or in accordance with another aspect of this invention, the juice and oil may be collected separately.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIG. 1 is a side elevational view of a citrus fruit juice extractor incorporating the present invention;

FIG. 2 is an end elevational view of the extractor of FIG. 1;

FIG. 3 is a top view of the extractor of FIG. 1;

FIG. 4 is an enlarged, cross-sectional view substantially along the line 4—4 of FIG. 3;

Figure 5:
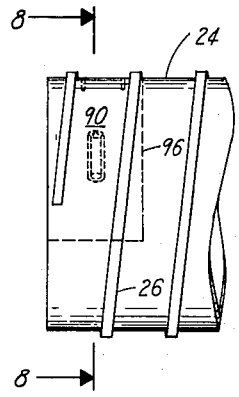
FIG. 5 is a reduced, fragmentary, side view of a portion of the apparatus of FIG. 4.

With reference to the drawings, and particularly FIGS. 1 to 4 thereof, a citrus fruit extractor incorporating the present invention comprises a frame generally indicated at 10. The frame 10 comprises vertical support members 11 and horizontal end and side support members 12 and 14, respectively, which are suitably mounted on the vertical supports 11. A screw generally indicated at 16 is rotatably supported on the frame 10 and has an inlet end or first portion generally contained in a hopper or feed bin 18. The hopper 18 has a generally rectangular cross-sectioned upper or inlet portion 20 and a lower generally semicylindrical portion 22. The hopper is mounted on one of the horizontal end support members 12. The screw 16 is coaxially received within the semicylindrical portion 22 of the hopper and has a hollow central member or shaft 24 having a smooth imperforate peripheral surface. Surrounding the shaft 24 and mounted coaxially thereon is an imperforate, helical rib 26.

With particular reference to FIG. 4, the rightward or inlet end of the screw 16 carries a stub shaft 28 which is journalled in a radial and axial thrust bearing 30 on the end wall 32 of the hopper 18. The inner end of the shaft 28 is received within a cylindrical sleeve or boss 34 which extends coaxially of the shaft 24 and is carried by circular plate 36 disposed concentrically within and fixed for rotation with the inlet end of the shaft 24. The inner end of the shaft 28 is keyed to the sleeve 34 and the outer end of the shaft is suitably connected, such as by chain and sprocket drive, to drive means such as an electric gear motor 38 mounted on the frame 10. The other or outlet end of the screw carries a shaft 40 extending coaxially thereof. The outer end of the shaft 40 is journalled in a radial and axial thrust bearing 42 carried by an end plate 44 supported on the frame 10. The inner end of the shaft 40 is coaxially received within and keyed to a cylindrical sleeve or boss 46 which is fixedly mounted on a circular plate or disc 48 received concentrically within and fixed to the leftward or outlet end of the screw 16.

Disposed between the hopper 18 and end plate 44 of the extractor is a liquid collecting trough or tank 46 comprising a generally semi-cylindrical sheet metal member 48 the ends of which are fixed in fluid sealed relation to a pair of concentric, axially spaced support members 50 and 52. The trough 46 is provided with a pair of liquid drain fittings adjacent its opposite ends, respectively. The support members 50 and 52 are mounted on the frame 10, and as can be seen from FIG. 4, the lower semicylindrical portion 22 of the hopper is fixed in sealed relation, such as by welding, to the support plate 50.

Both the support plate 50 and 52 are provided with annular rings for flanges 54 disposed concentrically about the bordering edge portions of circular openings in the support members, with the openings being disposed concentrically of the rotational axis of the screw 16. The flanges 54 face oppositely and toward each other, and each concentrically supports, by a scarf joint, a screen supporting ring 56. A cylindrical, foraminate sleeve is disposed coaxially over the screw and is secured at its opposite ends to the ring members 56. The perforations in the sleeve 58 are relatively large. For example, in a screen having a diameter of approximately 2 feet, the sides of the hexagonal openings in the sleeve might be spaced apart approximately 1 inch. The sleeve 58 is stiffened by a plurality of annular ribs 60 mounted concentrically about the sleeve and by a plurality of longitudinally extending ribs or flanges 62 extending longitudinally of the outer peripheral surface of the sleeve. As shown in FIG. 4, the sleeve 58 is lined with a fine mesh screen 64, the mesh size of which will determine the amount of pulp passing into the collection bin 46 during operation of the apparatus. In a specific embodiment of the invention used for extracting juice from oranges, a screen such as 64 having approximately .020 inch openings has been found to be satisfactory. The screen 64 is of relatively thin material, for example on the order of 0.030 inch thick, and the sleeve 58 provides radial support for the screen 64 during an extracting operation. The screen 64 is fixed to the sleeved 58 at its edges only.

A generally semicylindrical cover 66 is disposed over the upper portion of the screen 58 in radially outwardly spaced relation thereto. The cover 66 is supported on flanges on the screen supporting plates 50 and 52 and terminates at lower edges, as at 68 in FIG. 1, which mate with the upper longitudinal edges of the semicylindrical body member 48 of the collecting trough 46. A cover 70 similarly provided and mounted between the screen supporting plate 52 and end plate 44. The cover 70 extends downwardly beyond the shaft 40 but terminates short of the lowermost portion of the screen 64.

With particular reference to FIG. 4, the shaft 24 of the screw is cylindrical from the inlet end of the screw to a point 72 which is located adjacent the inlet end of the screen 64. The shaft is thereafter reversely tapered toward the outlet end of the screw to a point 74 intermediate the ends of the screens 64. From the point 74 to the outlet end of the screw the shaft is cylindrical. The reversely tapered or frusto-conical portion 76 of the shaft generally correspond to the juicing portion of the apparatus. The rib 26 extends from the inlet end of the shaft to the outlet end and has a constant outer or crest diameter. The crest 78 of the rib passes in closely adjacent the inner wall of the semicylindrical portion 22 of the hopper. Further, the outer diameter of the screw is dimensioned so that it is spaced from the inner wall of the screen supporting sleeve 58 a distance slightly greater than the thickness of the screen 64. As previously noted, the screen 64 is secured to supporting sleeve 58 only at its edges. When the screw is operated without fruit in the apparatus, the crest of the rib 26 may slidably engage at least the upper portion of the screen 64. However, with fruit in the machine and the machine operating, the fruit between the shaft 24 and screen 64 will push the screen outwardly against the inner surface of the supporting sleeve 58, whereby the crest of the rib 26 will be spaced from the inner surface of the screen 64. In a specific embodiment of the invention the spacing between the crest of the rib 26 and inner surface of the screen 64 was on the order of .010–.020 inch when the screen 64 was engaged firmly against the inner wall of the supporting sleeve 58.

As can be seen in FIG. 4, the helical rib 26 and shaft 24 of the screw define a generally rectangular cross-sectioned channel extending helically about the axis of the screw. The depth of the channel is determined by the difference between the root diameter and crest diameter of the rib 26, with the root diameter of the rib being determined by the outer diameter of the shaft 24. The cross-sectional diameter of the channel is determined by the pitch of the rib 26. In the specific embodiment shown, the pitch of the rib 26 is constant from the inlet end of the rib at least to the point 72 corresponding to the lesser diameter end of the frusto-conical portion 76 of the shank 24. The pitch of the rib remains constant for about 3 turns of the rib as the rib enters the confine of the screen 64. From the point 80 to about the point 82, the pitch of the rib progressively increases so that next adjacent turns of the rib from the point 82 to the outlet end of the screw are spaced apart a distance substantially greater than the spacing of the turns of the ribs between the point 80 and the inlet end of the screw. From the point 82 to the outlet end of the screw the pitch of the rib remains substantially constant.

In accordance with one aspect of the invention the pitch and height of the rib 26 at the inlet end of the machine is selected to size the cross-sectional area of the channel formed by the rib and shank of the screw in substantial conformity with the size of fruit being processed. For example, where the machine is being used to process oranges varying in diameter between 2¼ and 3 inches the height of the rib might be 3 to 3½ inches with the pitch of the rib being such that the oppositely facing surfaces of next adjacent turns of the rib are spaced apart approximately 3½ inches. With the channel of the screw being sized as described, fruit will tend to be fed from the hopper into the juicing portion of the machine in a row one after another with the row being one fruit wide and one fruit deep. As the fruit enters the juicing portion of the machine it is compressed between the screen 64 and the frusto-conical surface of the reversely tapered portion of the screw. As will be observed in FIG. 4 the taper of this portion of the screw is quite gradual extending a distance at least corresponding to three turns of the rib and preferably corresponding to six or seven turns of rib. Therefore, as the fruit enters the juicing portion pressure is gradually applied thereto in directions generally radially of screw axis. This gradual application of pressure on fruit causes the fruit to crack or split, while the simultaneous rotation of the screw causes the fruit to be spread apart, normally with the outer surface of the skin of the fruit being disposed next adjacent the screen 64. It should here be emphasized that the fruit is split and spread apart, rather than crushed, as exemplified by the fact that after the fruit is split and spread apart, the entire skin side of the fruit is usually disposed next adjacent the screen 64, and in many cases the fruit is substantially in two halves. As the fruit progresses through the juicing section, the increasing diameter of the screw shaft results in increasing pressure being applied to the fruit to extract substantially all of the juice from the fruit by the time the fruit reaches the outer end of the frusto-conical portion 76 of the shank.

At the same time that the fruit is being squeezed to extract the juice therefrom, it is being flattened. The decreasing pitch of the screw intermediate the ends of the juicing portion accommodates this increase in size of the skin or rind. For example, adjacent turns of the rib 26 might be spaced apart 5 inches subsequent to the point 82 as opposed to 3–3½ inches prior to the point 80. The location of the skin next adjacent the screen 64 assists in reducing any tendency of the screen 64 to clog with pulp as the pulp tends to be maintained between the skin and the outer surface of the screw shank 24.

As the fruit passes out of the juicing portion and past the point 74 where the screw shank again becomes cylindrical the relatively close spacing of the cylindrical surface of the outlet end of the screw shank from the screen 64 results in the maintenance of a relatively high pressure on the skins of the fruit for the remainder of the time that the skins are in the machine. For example, the height of the rib might be reduced for about 3–3½ inches at the lesser diameter end of the tapered portion 76 of the shank to about ⅜" at the greater diameter end of the tapered portion 76. By the time the fruit has reached the leftward or outer cylindrical portion of the screw shank, substantially all of the juice will have been extracted therefrom, and the pressing operation from thereon essentially produces oil from the rinds of the fruit. In accordance with one aspect of the invention where it is desirable to maintain a very low oil content in the juice the collection trough 46 may be provided with a baffle 84 located substantially in registry with the outer end of the frusto-conical portion of the screw shank and intermediate the drain fittings on the trough, whereby any liquid extracted from the fruit as it passes along the cylindrical portion of the screw shank adjacent the outlet end may be collected separately from the liquid extracted prior to this point. Where the baffle 84 is not provided, the oil content of the liquid in the trough 46 may be on the order of 5 parts per thousand in an orange juice extracting operation. While this is generally satisfactory, if a still further reduction of oil content is desired the baffle 84 may be provided. If desired, the baffle may be suitably mounted so as to be readily removeable from or assembled into the trough 46; and further, if desired, the baffle might be mounted for selective adjustment in one of a plurality of positions spaced longitudinally of the screw axis, thereby to provide still finer control of the oil content in the juice. Thus the apparatus of this invention is operable to extract juice from whole fruit and also to finish the rinds and rags remaining after the juicing step. In prior practices the juicing is first accomplished normally by pressing the fruit in one machine, and then the rags and rinds are placed in a different machine for removal of oil. Accordingly, it will be seen that contrary to prior practices wherein separate machines and additional handling of the fruit were required for the jucing and finishing operations, the apparatus of this invention accomplishes these steps in a continuous, sequential manner by the continued application of pressure on the fruit rinds and rags after the juice has been extracted and by the separate collection of the liquid from the juicing and finishing portions of the apparatus.

Figure 6:
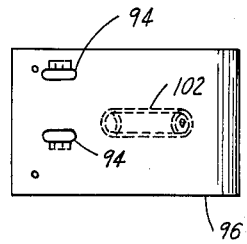
FIG. 6 is an enlarged plan view of all of the elements of FIG. 5.
Figure 7:
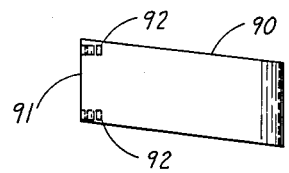
FIG. 7 is an enlarged plan view of another of the elements of FIG. 5.
Figure 9:
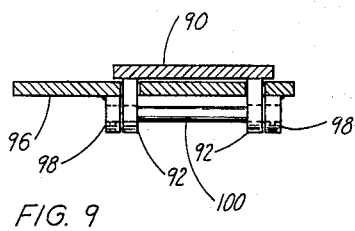
FIG. 9 is an enlarged, cross-sectional view substantially along the line 9—9 of FIG. 8.
Figure 8:
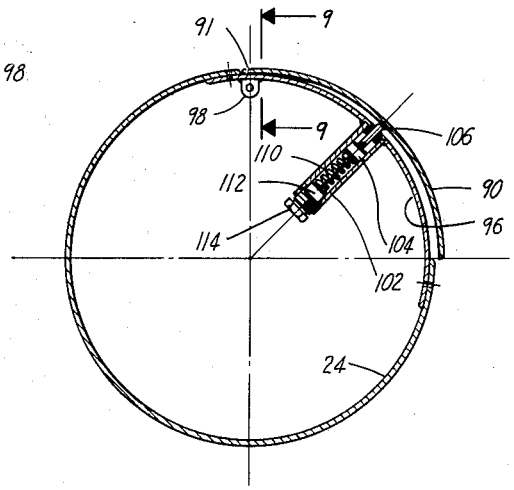
FIG. 8 is an enlarged cross-sectional view substantially along the line 8—8 of FIG. 5.

In some cases it is necessary to provide back pressure on the fruit rinds exhausting from the machine in order to be sure that the fruit does not pass too quickly through the liquid extracting portion of the machine with the result that the percentage of the liquid extracted is not as great as might be desired. Accordingly, and with reference to FIGS. 4–9 there is provided, at the outlet end of the channel formed by screw, a flipper 90 which forms a continuation of the outer surface of the screw shank but which is movable generally radially outwardly of the screw so as to provide means tending to obstruct or impede the passage of fruit rinds out of the machine. As a result, the rinds will tend to pack up into a relatively solid mass for a certain distance inwardly of the open outer end of the screw, and the rate of passage of the fruit through the machine and particularly through the liquid extracting portions thereof may be controlled by the amount of the back pressure applied by the flipper 90.

More particularly the flipper 90 comprises an arcuate member which fits in an opening in the shank 24 and closely between adjacent turns of the rib 26 at the outlet end of the screw. The end 91 of the flipper closer to the inlet end of the screw, in other words the leading edge of the flipper, forms a continuation of the shank of the screw. Adjacent its leading edge, the flipper is provided with a pair of ears 92 which extend through openings 94 in a backing plate 96 which is fixed to the inner wall of the screw shank 24. The backing plate 96 is provided with a pair of lugs 98 and a shaft 100 extends through the ears 92 and lugs 98 to pivot the flipper on the backing plate for movement of the opposite end or trailing edge of the flipper generally radially outwardly of the screw axis. The backing plate 96 is generally arcuate in longitudinal cross-section and generally conforms to the curvature of the screw shank 24, whereby the outer surface of the backing plate forms a continuation of the inner surface of the shank and is generally complementary to the inner surface of the flipper 90.

Means are provided tending to move the flipper in a direction toward the screen 64. It is preferred that the means for tending to move the flipper outwardly be adjustable or controllable in order to adjust or control the pressure exerted by the flipper on the exhausting mass of rinds and thus attendantly controlling the back pressure on the feed of fruit through the machine. In the specific embodiment shown resiliently yieldable means are provided for this function with such means comprising a sleeve or tube 102 carried by the backing plate 96 and extending generally radially inwardly toward the screw axis. Slidably disposed within the tube 102 adjacent the backing plate 96 is plug or piston 104 within which is coaxially and threadably mounted one end of a pin 106. The pin 106 extends through the backing plate and has a rounded outer end which bears against the inner surface of the flipper 90. Disposed within the tube 102 between the piston 104 and outer end of the tube is a coil compression spring 110 which is engaged at its outer end by second plug or piston 112 slidably received within the tube 102. Engaging the outwardly facing end of the piston 112 is a threaded adjusting member or plug 114. By threading the plug 114 inwardly or outwardly of the tube 102 the compression of the spring 102, and accordingly the pre-loading of the flipper 90, may be adjusted as desired for the proper back pressure at the outlet end of the machine.

It has been found that by proper sizing of the fruit containing channel adjacent the outlet of the machine additional means, such as the flipper 90, for obstructing passing of material out of the machine may be eliminated. More particularly, if the depth of the channel formed by the screw 16 and screen 64 in this portion of the machine is reduced sufficiently, there will be adequate frictional resistance between the rinds of the fruit and screen 64 to cause a relatively solid packing of the rinds adjacent the outlet end of the machine, thus providing the desired back pressure in the juicing portion of the machine. The action of the machine of this invention whereby the fruit passing through the extracting portion of the machine with the outer surface of the skin in sliding engagement with the screen 64 tends to permit reliable controlling of back pressure by the selective sizing of the depth of the channel adjacent the outlet end of the screw.

It is believed that the operation of the machine just described will be generally apparent from the foregoing and that only a brief description thereof is required. Fruit is fed into the hopper 18 so as to fall between adjacent turns of the screw underlying the hopper. The screw is rotated to feed the fruit toward the outlet end of the machine. In a specific embodiment of the machine used to process oranges, the screw was rotated at a speed of between 150 and 180 r.p.m. The fruit is fed longitudinally of the machine by the screw to the inlet of the liquid extracting portion generally defined by the lesser diameter of the frusto-conical portion of the shank. As the fruit is passed through the initial portion of the liquid extracting portion, it is cracked and spread apart with the outer skin facing outwardly and is compressed to extract the juice therefrom. After the fruit is moved from the frusto-conical portion of the shank onto the cylindrical outlet portion, pressure is maintained on the fruit to extract primarily oil from the rinds. In order to assist in the passage of the fruit rinds from the frusto-conical portion of the shank to the outlet cylindrical portion, the juncture of these two portions is preferably rounded, as shown in FIG. 4. It will be observed that the compression of the fruit in the juicing portion of the apparatus is quite gradual extending over approximately 6 turns of the rib 26. It is this gradual application of pressure on the fruit that effects the splitting or cracking and spreading of the fruit, rather than crushing thereof, and which is an important aspect of the apparatus and method of this invention. Additionally the decrease of the pitch of the screw intermediate the ends of the portion of the screw in the juicing portion of the machine further contributes to the splitting rather than crushing of the fruit and permits the fruit to be flattened out in the manner previously described with the outer skin in sliding engagement with the screen 64. To obtain the performance desired in a screw press of this invention the helical passage formed by the screw and screen should have a cross-sectional area at the inlet end of the frusto-conical portion 76 which is no greater than approximately 4 times the area of the passage at the outlet end of the portion 76 with said portion extending longitudinally of the screw axis of a distance corresponding to at least 3–5 turns of the rib 26. Also, the width of said passage at the inlet and outlet ends of said portion 76 should be in a ratio of not less than about 1:1.4.

It is preferred that the portions of the machine coming in contact with the fruit be fabricated of stainless steel in order to improve the corrosion resistance and service life of the machine. The operating parts of the machine are readily accessible for cleaning. The cover 66 need merely be removed, and while the screw is rotated, water played onto the outside of the screen support 58. In the embodiment shown, further accessibility internally of the machine is provided by fabricating the screw supporting sleeve 58 and associated elements to provide a pair of semicylindrical elements having longitudinal ends provided with radially outwardly extending mating flanges which may be bolted together. These flanges (not shown) extend longitudinally of the screw axis in horizontal registry with the screw axis and the longitudinal edge of the screen 64 may be clamped therebetween. In the preferred embodiment described above the screw rib and screen means have constant outer and inner diameters, respectively. However, it will be apparent to those skilled in the art that the same desired results might be achieved by gradually reducing the screw rib outer diameter and the screen means inner diameter over a predetermined portion of the screw length generally corresponding to the frusto-conical portion 76 of the shank 24 of the preferred embodiment.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. In a screw press for extracting liquid from citrus fruit, an extracting screw having an inlet feed portion and a next adjacent liquid extracting portion, foraminate means surrounding at least a portion of said extracting portion, the screw at the inlet portion thereof forming a channel having cross-sectional dimensions generally equal to the largest size of the citrus fruit being processed, said foraminate means and screw cooperating to provide a helical passage extending about the screw axis, the depth of said passage extending radially of the screw axis gradually diminishing from adjacent the inlet end of said extractor portion toward the outlet end thereof over a predetermined portion of the screw, the width of said passage as measured parallel to the screw axis being greater adjacent the outlet end of said predetermined portion than adjacent the inlet end thereof, the cross-sectional area of said passage just prior to the inlet end of said predetermined portion being no greater than approximately 4 times the cross-sectional area of said passage at the outlet end of said predetermined portion, said predetermined portion extending a distance corresponding to at least 3–5 turns of said passage, the width of said passage as measured parallel to the screw axis at the inlet and outlet ends of said predetermined portions being in a ratio of no less than about 1:1.4, thereby permitting the citrus fruit to be split between sad inlet and outlet end and thereafter to spread same in a flattened condition in said passage adjacent said outlet end.

2. In a screw press for extracting liquid from citrus fruit, a rotatably mounted screw having an inlet end and an outlet end and comprising a shank having a cylindrical portion extending from the inlet end of the screw and terminating in a reversely tapered frusto-conical portion, said screw further comprising a helical rib extending co-axially about the shank, the rib and shank forming a channel at the inlet end portion of the screw having cross-sectional dimensions generally equal to those of the largest size of the citrus fruit being processed, the pitch of said rib being greater adjacent the greater diameter end of said frusto-conical portion than adjacent the lesser diameter end thereof, and means adjacent the outlet end of the screw tending to impede the discharge of solid material from the screw and including a member extending and disposed between a pair of next adjacent turns of the rib, means mounting said member adjacent the end thereof remote from the outlet end of said screw for pivotal movement of the other end of the member generally radially of the screw axis, and resilient yieldable means acting on said member to tend to move said other end of the same outwardly of said screw axis.

3. In a screw press, a screw having an inlet end and an outlet end, the outlet end of said screw comprising a shank having a tubular cross-section and a helical rib extending about the shank, an arcuate supporting member fixed to the inner surface of said shank adjacent the outlet end of the screw and underlying a portion of a pair of next adjacent turns of said rib, said shank being provided with an opening between said next adjacent pair of turns of said rib and overlying said supporting member, an arcuate second member fitting in said openings and adapted to lie complementally over the portion of said supporting plate in registry with said opening, said second member having a leading edge at the end thereof remote from the outlet end of said screw with the outer surface of the leading edge portion of said second member generally forming a continuation of the next adjacent outwardly facing surface of said shank, means pivotally mounting said second member on said supporting member adjacent the leading edge of said second member for movement of the other end thereof generally toward and away from said shank, and means carried by said supporting member to provide a resiliently yieldable force on said second member tending to move said other end thereof away from said shank.

4. In a screw press, a screw including a screw having an inlet end and an outlet end, the outlet end of said screw comprising a hollow shank and a helical rib extending about the shank, a supporting member fixed to the inner surface of said shank adjacent the outlet end of the screw and underlying a portion of a pair of next adjacent turns of said rib, said shank being provided with an opening between said next adjacent pair of turns of said rib and overlying said supporting member, an arcuate second member fitting in said opening and adapted to lie complementally over the portion of said supporting plate in registry with said opening, said second member having a leading edge at the end thereof remote from the outlet end of said screw with the outer surface of the leading edge portion of said second member generally forming a continuation of the next adjacent outwardly facing surface of said shank, means pivotally mounting said second member on said supporting member adjacent the leading edge of said second member for movement of the other end thereof generally toward and away from said shank, a tubular member mounted on said supporting member and extending inwardly of the shaft axis therefrom, a first plug member slidably received in said tubular member adjacent one end thereof next adjacent said supporting plate, a pin carried by said first plug member and extending outwardly of said one end of said tubular member through said supporting member and bearing on the undersurface of said second member, a coil compression spring disposed within said tubular member and acting at one end on said first plug member, a second plug member slidably disposed in said tubular member and bearing against the other end of said spring, and means at the other end of said tubular means bearing on the side of said second plug member opposite said spring and being selectively adjustable axially of the tubular member.

5. In a screw press as described in claim 4, said last mentioned means comprising a trough underlying said frusto-conical and second cylindrical portions of said shank, baffle means extending across said trough and separating the same into two sections, and means mounting said baffle for selective location in a plurality of positions longitudinally of the screw axis, and drain means on each side of said baffle.

References Cited by the Examiner

UNITED STATES PATENTS

| | | | |
|---|---|---|---|
| 703,190 | 6/1902 | Geurink | 100—148 |
| 772,230 | 10/1904 | Farner | 100—122 |
| 829,314 | 8/1906 | Anderson | 100—50 |
| 1,850,001 | 3/1932 | D'Annunzio | 100—37 |
| 2,104,197 | 1/1938 | Johansen | 100—145 |
| 2,212,066 | 8/1940 | Fry. | |
| 2,644,393 | 7/1953 | Harden | 100—105 |
| 2,799,218 | 7/1957 | Leslie et al. | 100—37 |
| 2,817,287 | 12/1957 | Onarheim et al. | 100—147 X |
| 2,935,931 | 5/1960 | Ginaven | 110—117 |
| 3,009,412 | 11/1961 | Jung | 100—148 |
| 3,034,423 | 5/1962 | Demoisy | 100—117 |

FOREIGN PATENTS 480,753   5/1953   Italy.

WALTER A. SCHEEL, *Primary Examiner.*

LOUIS O. MAASSEL, *Examiner.*